Oct. 28, 1958  B. BOYD ET AL  2,858,406
POWER FACTOR COMPENSATOR
Filed Dec. 8, 1954

WITNESSES:
E. A. McCloskey
R. M. Brodahl

INVENTORS
Bruce Boyd
and Maurice J. Gelpi.
BY
F. E. Browder
ATTORNEY

United States Patent Office 2,858,406
Patented Oct. 28, 1958

2,858,406

POWER FACTOR COMPENSATOR

Bruce Boyd, Baltimore, and Maurice J. Gelpi, Catonsville, Md., assignors to Westinghouse Electric Corporation, East Pittsburgh, Pa., a corporation of Pennsylvania Application December 8, 1954, Serial No. 473,996

3 Claims. (Cl. 219—10.75)

Our invention relates to induction-heating devices and, in particular, relates to regulating arrangements for adjusting both work voltage and power factor at each of a plurality of load circuits which are supplied with power from a single generator.

Induction heating loads, of which an iron ingot or mass heated by currents induced in it by an inductor winding may be taken as typical, usually have in themselves a badly lagging power factor; and it is usual to correct this by connecting a capacitor in multiple with the load. Changes with temperature, as the load heats up, of its electrical characteristics make it necessary to adjust both the impedance of the load channel and the impedance of the capacitor channel, and this must be done separately at each load station in order to maintain even an approximation to unity power factor at the supply generator. This is accomplished in accordance with our invention by providing saturable reactors at each load station which are regulated to maintain the net load characteristic desired.

One object of our invention is accordingly to provide induction heating loads with regulating means for maintaining approximately constant power factor on each load when connected to a distribution system.

Another object is to provide a system heating a ferromagnetic type of load in a cycle passing through the Curie temperature with an automatic adjusting means for compensating for the change in permeability experienced by the load at the Curie point.

Another object is to provide an arrangement which shall automatically adjust the circuits supplying an induction heating load to maintain approximate constancy of power factor at its supply point.

Other objects of our invention will become apparent upon reading the following description taken in connection with the drawing, in which.

Figure 1:
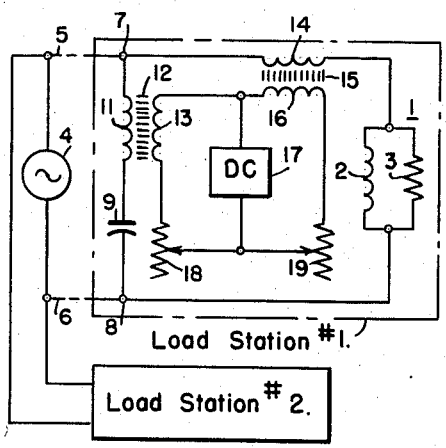
Figure 1 is a diagrammatic showing of one circuit arrangement embodying the principles of our invention.

Referring in detail to Fig. 1, an induction-heating load 1, which draws both a wattage and a lagging wattless current and so may be symbolized by an inductor 2 and a resistor 3, is supplied with current from an alternating voltage source 4 through distribution lines 5 and 6. The load 1 and its associated regulating circuits now to be described may represent but one of a plurality of similar load stations connected in multiple on the distribution lines 5, 6. It is desirable to maintain constant, at one hundred percent or a little leading, the power factor at the points 7, 8 where the station terminals connect to distribution lines 5 and 6. With this in view, a capacitor 9 in series with a saturated reactor 11, preferably having an iron core 12 and a direct-current saturating winding 13, are bridged in series across the points 7, 8. Such saturable reactors having alternating current windings 11 and direct current windings wound in non-inductive relation to each other are well-known in the electrical art so that their detailed description is believed to be unnecessary.

The load 1 is connected across the points 7, 8 through the alternating current winding 14 of a second saturated reactor having magnetic core 15 and a direct current winding 16. The direct current windings 13 and 16 are respectively connected to a direct current source 17 through adjustable resistors 18 and 19. Adjustment of the resistors 18 and 19 changes the magnetic saturation of the cores 12 and 15 and so changes the reactance of the windings 11 and 14 in a well-known manner. The resistor 18 thus controls the amount of leading wattless current drawn by capacitor 9 and the resistor 19 controls the current and voltage at the load 1; thus, the voltage impressed on load 1 may be set at any desired value, and the current drawn by capacitor 9 adjusted to the magnitude required to fix the power factor across points 7, 8 at one hundred percent or any other desired value. If, as a result of heating, the electrical constants of the load 1 change so that this power factor assumes an undesired value, the resistor 18 may be adjusted to bring the power factor back to the value desired. In most practical non-magnetic loads the resistive component of the load 3 increases as heating proceeds while the reactive component remains nearly constant so that it is desirable to increase the load voltage by adjusting resistor 19 to increase the saturating current, in reactor winding 16. Since the load reactance will not have changed appreciably and the reactance of 14 has been lowered a greater wattless lagging current will flow in the load branch. To restore the power factor at 7—8 to unity it is necessary also to increase the wattless leading current through 9 and 11. This is accomplished by increasing the reactance of 11 so as to lower the net reactance of the combination of 11 and 9 in series. In other words, it is usually desirable to decrease the reactance of winding 11 at a time when the reactance of winding 14 is increased, and vice versa.

Figure 2:
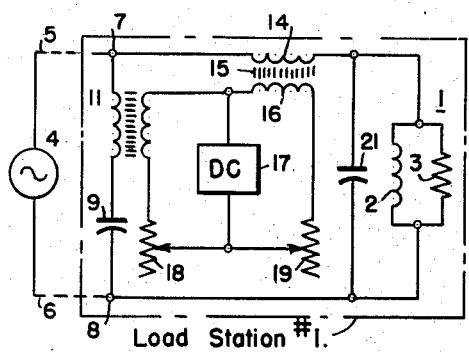
Fig. 2 is a similar showing of another circuit embodying such principles.

Fig. 2 shows an arrangement similar to Fig. 1 except that a capacitor 21 is shunted across the load to supply part of its wattless current component. In general, this reduces the amount of wattless current which capacitor 9 is called upon to supply, and reduces the currents which windings 11 and 14 must carry, thereby reducing the size of the two saturable reactors. Otherwise, the circuit of Fig. 2 is like that in Fig. 1, similar circuit elements being designated by the same reference numerals, and no further detailed description of Fig. 2 appears necessary.

Figure 3:
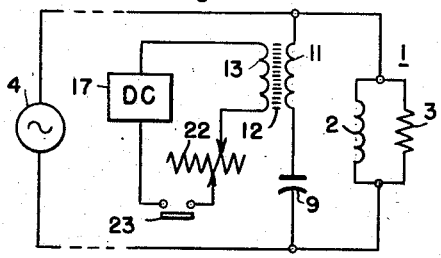
Fig. 3 is a similar showing of a third form of circuit adapted to automatically maintain constancy of power factor on an induction heater for a ferromagnetic load.

Fig. 3 shows one useful embodiment applying the principles of our invention to the automatic maintenance of constant power factor on a widely used type of induction heater in which the load comprises an iron or steel object. As is well known, such loads exhibit abrupt decrease of magnetic permeability when heated to a temperature known as the Curie point. As a result, the wattless component of the load impedance drops abruptly at that temperature, and maintenance of constant power factor requires a corresponding increase of the wattless current in the compensating capacitor channel. In Fig. 3, a load 1 comprising an induction furnace for heating an iron or other ferromagnetic object is symbolized by an inductor 2 and a resistor 3 fed from an alternating source 4. Power factor compensation is provided for by connecting across the supply lines a channel comprising a capacitor 9 in series with a saturable reactor having an alternating current winding 11, a magnetic core 12 and a direct current control winding 13. Current to winding 13 is supplied by a direct current source 17 through a resistor 22, part or all of which may be short-circuited by closure of the contacts 23 of a relay (not shown) of a type well known in the art which opens contacts 23 when the power factor of the energy in load 1 exceeds a predetermined value; or alternatively the relay may be actuated by a timer adjusted to operate at the predetermined time when the load temperature reaches the Curie point. The relay may also be actuated by a signal depending on the load temperature.

When heating of load 1 is first initiated its temperature will, in general, be far below the Curie point, and the power factor at the terminals of load 1 will be far less than one hundred percent, even though resistor 22 is fixed at such a value, when contacts 23 are closed, as to make the power factor furnished to terminals 7, 8 equal to one hundred percent. The contacts 23 will thus be held closed until the load is heated to its Curie point, whereupon the power factor at load 1 abruptly drops, causing contacts 23 to open and insert an appropriate portion of resistor 22 to so increase the impedance of winding 11 that the power factor at terminals 7, 8 is restored to one hundred percent also.

Figure 4:
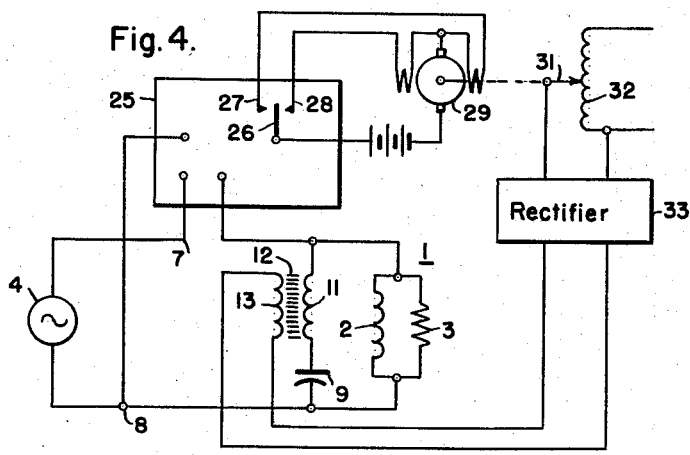
Fig. 4 is a similar showing of a regulating circuit adapted to maintain automatically constancy of power factor at a load station supplying any type of low power factor load.

Fig. 4 shows an arrangement for automatically adjusting the direct current in the control winding 13 of a saturable reactor so governing a power-factor-compensating capacitor 9 as to maintain the power factor constant on a line supplying an induction-heating load 1. To effect this result, we connect a varmeter or power-factor meter 25 of well-known type adjusted to maintain a movable contact 26 midway between a pair of fixed contacts 27 and 28 when the power factor at the points has a value of one hundred percent or some other desired value. When the power factor across points 7, 8 lags this desired value contacts 26 and 27 close and cause a motor to move the tap 31 on an alternating voltage source 32 to a lower value; and when the power factor across 7, 8 leads the desired value contact 26 is moved to contact 28 and cause motor 29 to raise the voltage tap 31 to a higher voltage. A rectifier supplied from tap 31 thus changes the control current in winding 13 in such a way as to alter the wattless current drawn by capacitor 9 in the direction necessary to restore the power factor to its desired value.

Figure 5:
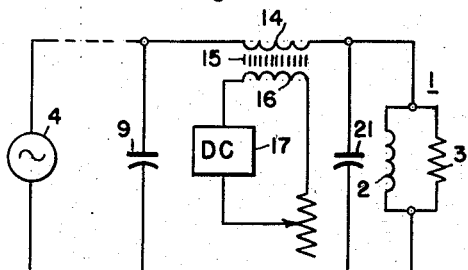
Fig. 5 is a similar showing of a simplified circuit particularly adapted to loads with impedances which vary through a limited range.

While we have shown only one load station on the line it should be obvious that any number of other stations could be provided with similar equipment. The circuits of Figs. 3 and 4 could each be equipped with manually operable or other saturated reactors similar to reactors 14, 15, 16 in Fig. 1 to vary the voltage impressed on load 1.

Where the load 1 has an impedance which does not vary through too wide a range, the simpler circuit shown in Fig. 5 will maintain a sufficient approximation to constancy in wattless current drawn from lines 5 and 6 to leave other loads connected to lines 5 and 6 sufficiently undisturbed for practical purposes. Thus, in Fig. 5 the saturated reactor 12 of Fig. 1 is omitted, and the capacitor 9 given the value about to be described. If the shunt channels 7, 9, 8 were omitted and the direct current through saturating winding 16 of reactor 14 were varied sufficiently so that the voltage at the terminals of load 3 varied over a 2 to 1 range (e. g., from 187.5 volts to 375 volts), the load current would be found to have a lagging wattless component which first increased to a maximum and then decreased; the maximum occurring when the circuit phase angle is forty-five degrees. If now the circuit of Fig. 5 is used with the capacitor 9 given such a value, that it draws a current equal to the maximum value mentioned in the preceding sentence, current drawn from the lines 5, 6 will always have a leading wattless component; but such operation will be found satisfactory in most cases, and the circuit will permit satisfactory control of load power. This arrangement has proved highly satisfactory where the load consisted of a series of similar metallic objects moved by a conveyor through the inducing winding of an induction heater.

We claim as our invention:

1. In combination with an alternating current supply source and an induction heating load, means including a first saturable core reactor connecting said load to said source, a current channel shunting said source and including a capacitance and a second saturable core reactor connected in series, a direct current control winding for each of said saturable core reactors, and means connected to said control windings for varying current flow therethrough.

2. In combination with an alternating current supply source and an induction heating load, means including a first saturable core reactor connecting said load to said source, a current channel shunting said source and including a capacitance and a second saturable core reactor connected in series, a direct current control winding for each of said saturable core reactors, and means connected to said control windings for increasing the reactance of said second saturable core reactor when the reactance of said first saturable core reactor is decreased.

3. In combination with an alternating current supply source and an induction heating load, means including a first saturable core reactor connecting said load to said source, another load connected to said source, a current channel shunting said source and including a capacitance and a second saturable core reactor connected in series, a direct current control winding for each of said saturable core reactors, and means connected to said control windings for varying current flow therethrough.

References Cited in the file of this patent

UNITED STATES PATENTS

| | | |
|---|---|---|
| 1,878,350 | Thompson | Sept. 20, 1932 |
| 1,885,155 | Suits | Nov. 1, 1932 |
| 1,940,295 | Chutter | Dec. 19, 1933 |
| 2,040,684 | Boyajian | May 12, 1936 |
| 2,085,061 | Aggers | June 29, 1937 |
| 2,421,786 | Haug | June 10, 1947 |